3,306,137
CLIP BUSHING
Joseph J. Mele, 2578 Sawmill Road,
North Bellmore, N.Y. 11710
Filed Feb. 14, 1964, Ser. No. 345,027
7 Claims. (Cl. 77—62)

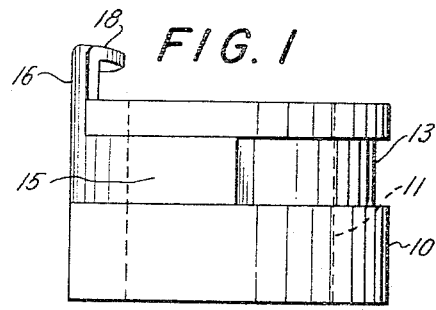
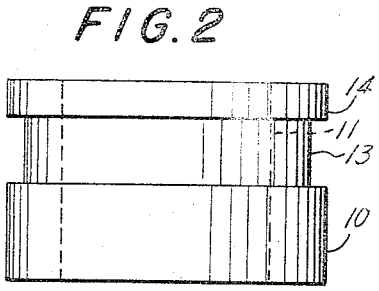
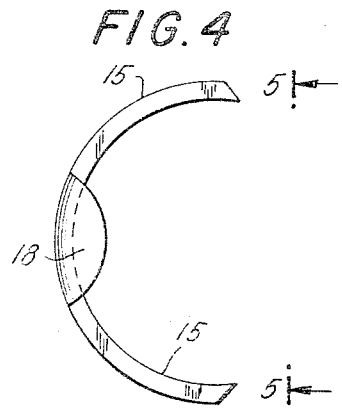
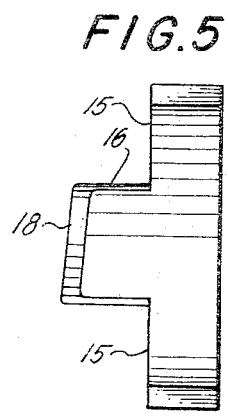
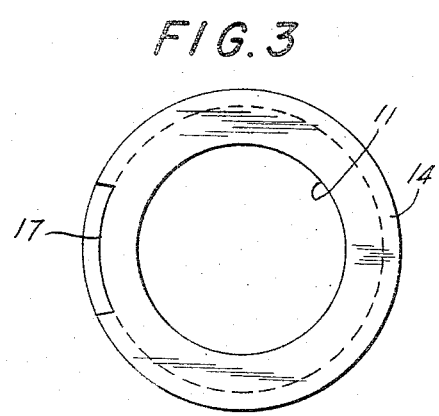
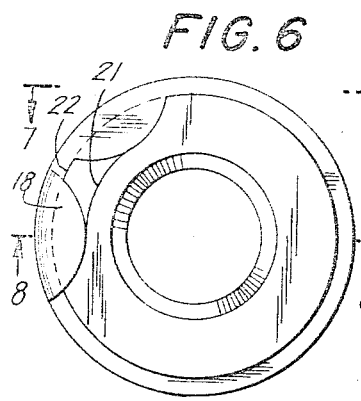
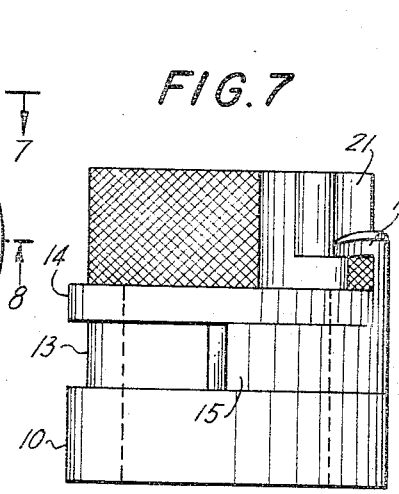
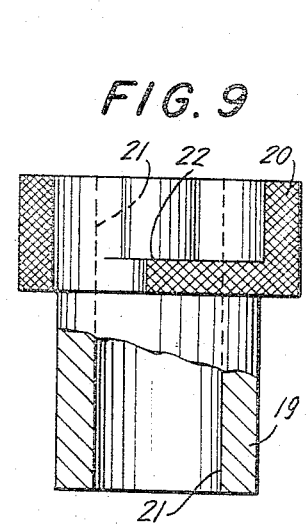
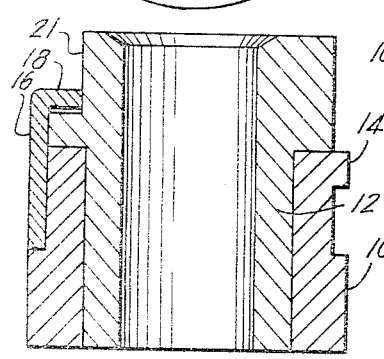

This invention relates generally to drill bushings and is particularly concerned with an improvement in liner bushings.

As is well known, drill bushings are usually constructed of a hard material such as a tool steel. However, the hardness of such material is accompanied by a brittleness which, as will be hereinafter explained, imposes limitations upon the useful life of certain types of liner bushings.

Liner bushings are employed when it is desired to drill a series of successively larger holes, as determined by the drill passages of so-called slip bushings which are adapted for successive receipt within the bores of the liner bushings. When such slip bushings are employed, it is frequently deemed desirable to eliminate any tendency of the drilling means to cause their rotation with respect to the liner bushings with which they are used. For this purpose, it has been customary to provide a stop means formed integrally with the liner bushing and contactable with any slip bushing therein so as to oppose its rotation.

It frequently happens that such a stop means is formed of the same brittle material which composes the liner bushing; and, as a result, repeated impact of the slip bushing thereon often causes a rupture of the stop means, thereby terminating the useful life of the liner bushing.

Accordingly, it is an object of the present invention to provide a liner bushing which has an improved impact-resistant means for opposing the rotation of slip bushings employed in conjunction with such liner bushings.

Another object of the invention is to provide a liner bushing of the character described whose said impact-resistant means for opposing the rotation of slip bushings is replaceable in the event of breakage without requiring replacement of the remaining portion of the liner bushing with which it is used.

Another object of the invention is to provide a liner bushing of the character described, wherein said impact-resistant means for opposing the rotation of slip bushings occupies a minimum of space.

A further object of the invention is to provide a liner bushing of the character described of simple, economical and sturdy design.

Other objects and advantages of the present invention will become apparent from the following discussion as read in connection with the accompanying drawing.

In the drawing:

FIG. 1 is an elevational view of one embodiment of the present invention;

FIG. 2 is an elevational view of the body of the liner bushing employed in the aforesaid embodiment of the invention;

FIG. 3 is a plan view of the body of the liner bushing employed in this form of the invention;

FIG. 4 is a plan view of the clip which includes the impact-resistant means for opposing rotation of slip bushings employed with this form of the invention;

FIG. 5 is an end view of the said clip;

FIG. 6 is a plan view of the aforesaid liner bushing in operative assembly with a slip bushing;

FIG. 7 is an elevational view taken about the line 7—7 of FIG. 6;

FIG. 8 is a cross-sectional view taken about the line 8—8 of FIG. 6;

FIG. 9 is a partially cross-sectional elevational view of the slip bushing showing the depressed area and shoulder provided upon its flange.

Throughout the various views, similar numerals are employed to refer to similar parts of the illustrated form of the invention.

As shown in FIG. 2 of the accompanying drawing, one embodiment of the invention comprises a liner bushing having a generally cylindrical body 10 provided with a passage 11 extending through the body and adapted to receive a slip bushing 12 in the conventional manner.

The external surface of the body 10 is provided with a depressed portion, such as an annular groove 13, and a flange 14 formed with an indentation such as the notch 17 depicted in FIG. 3 of the accompanying drawing.

The body 10 is preferably composed of a hard, brittle material, such as a tool steel, as is the conventional practice. The body 10 is also embraced by springable means composed of a tough, resilient material, such as a spring steel. This springable means and its association with the body 10 of the liner bushing may be better understood from the following description.

Thus, as may be seen in FIGS. 4 and 5 of the accompanying drawing, the springable means comprises a clip provided with a pair of arcuate arms 15 and an upright member 16 disposed medially of said arcuate arms 15. The upright member 16 is provided with a lip 18 which is preferably inclined, as shown in FIG. 5.

As appears in FIG. 1 of the accompanying drawing, the arcuate arms 15 may be received in the annular groove 13 of the body 10 (which annular groove may be more clearly seen in FIG. 2). These arcuate arms 15 are springably received in the said annular groove 13 where they tend to remain by virtue of the fact that they extend through an arc greater than that of a half-circle. However, if desired, they can be expanded so as to permit their removal from the said annular groove 13, thereby permitting replacement of the clip, if desired. Such replacement will seldom be necessary since, as previously noted, the clip is composed of a tough material which is impact-resistant, thereby insuring against its rupture during handling or operative use of the liner bushing. However, if by reason of breakage or deformation of the clip, it becomes desirable to accomplish its disassembly from the body 10, such operation can be easily accomplished in the manner noted above. In addition, for purposes of packaging, shipment or the like, such disassembly is available, as desired.

As shown in FIGS. 6, 7 and 8, the assembled clip and body are employed with a slip bushing, which is depicted in elevation, in FIG. 9. This slip bushing comprises a generally cylindrical body 19 having an upper knurled flange 20 of generally cylindrical form and a drill passage 21 extending through the body 19 and flange 20 in the conventional manner. The circumferential periphery of the flange 20, however, is provided with a depressed area such as the offset portion 21 and a shoulder 22 extending in a plane perpendicular to the axis of the slip bushing, as seen in FIG. 9.

When the slip bushing is disposed within the passage 11 of the liner bushing, according to the conventional practice, the flange 20 of the slip bushing surmounts the flange 14 of the liner bushing; and said flange 20 may be rotated so as to bring the lip 18 of the upright member into contact with the surface of the offset portion 21 of the flange 20, thereby opposing further rotation of the slip bushing and, at the same time, opposing its axial displacement with respect to the liner bushing.

Such engagement may be seen in said FIGS. 6, 7 and 8, where the lip 18 is depicted in contact with the offset portion of the flange 21.

Thus, the lip 18 acts to prevent undesired movement of the slip bushing, such as might arise during drilling operations. Moreover, as will be seen in FIG. 5 of the accompanying drawing, the lip 18 is preferably inclined, thereby permitting its frictional engagement with the aforesaid shoulder 22 provided on the flange 20 of the slip bushing. Such frictional engagement tends to insure retention of the slip bushing in a fixed position so that vibration or other jarring action will not cause its dislodgement during drilling operations or other operative use of the slip and liner bushings.

When desired, however, the flange 20 may be counter-rotated so as to disengage the shoulder 22 from the lip 18, thereby permitting removal of the slip bushing from the liner.

It will also be seen from the foregoing that the clip occupies a space no greater than the overall diameter of the liner bushing; and that the component parts of such liner bushing are simple and sturdy in design and easily formed by conventional equipment. I have thus provided a simple liner bushing which accomplishes the invention hereinabove set forth.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. A liner bushing comprising, in combination:
 (a) a body having a passage therethrough adapted to receive a slip bushing;
 (b) a clip removably engaged with said body;
 (c) stop means depending from said clip;
 (d) said stop means being contactable with said slip bushing to oppose rotation thereof;
 (e) said stop means being wedgeably engageable with the external periphery of said slip bushing.

2. A liner bushing comprising, in combination:
 (a) a body having a passage therethrough adapted to receive a slip bushing;
 (b) said body having a brittle metal composition;
 (c) a clip composed of a resilient material;
 (d) said clip being provided with springable means and stop means;
 (e) said body being embraceable by said springable means;
 (f) said slip bushing being provided with flange means;
 (g) the external surface of said flange means being formed to accommodate said stop means;
 (h) said stop means being contactable with said flange means to oppose rotation thereof.

3. A liner bushing comprising, in combination:
 (a) a body having a passage therethrough adapted to receive a slip bushing;
 (b) said body being provided with a depressed portion and a flange;
 (c) said flange being provided with an indentation;
 (d) a clip provided with springable means and stop means;
 (e) said springable means being removably receivable within said indentation;
 (f) said slip bushing being provided with flange means;
 (g) the external surface of said flange means being provided with a depressed area to accommodate said stop means;
 (h) said stop means being contactable with said flange means to oppose rotation thereof.

4. A liner bushing comprising, in combination:
 (a) a generally cylindrical body having a passage therethrough adapted to receive a slip bushing;
 (b) said body being provided with an annular groove and a flange;
 (c) said flange being provided with a notch;
 (d) a clip provided with a pair of springable arms and an upright member;
 (e) said springable arms being removably engageable with said annular groove to dispose said upright member within said notch;
 (f) said slip bushing being provided with a generally cylindrical flange surmounting the flange of said liner bushing when the slip bushing is received within said passage;
 (g) said cylindrical flange having an offset position;
 (h) said offset portion being contactable with said upright member to oppose rotation of said slip bushing.

5. A liner bushing according to claim 3,
 (a) the depressed area on the external surface of said flange means being provided with a shoulder;
 (b) said stop means including an upright member having a lip;
 (c) said shoulder being frictionally engageable with said lip upon rotation of said slip bushing.

6. A liner bushing according to claim 5,
 (a) said shoulder extending in a plane perpendicular to the axis of said slip bushing;
 (b) said lip being inclined with respect to said plane.

7. A liner bushing comprising, in combination:
 (a) a generally cylindrical body having a passage therethrough adapted to receive a slip bushing;
 (b) said body being provided with an annular groove and a flange;
 (c) said flange being provided with a notch;
 (d) a clip provided with a pair of arcuate arms springably receivable in said annular groove;
 (e) said clip including an upright member disposed medially of said arcuate arms;
 (f) said upright member being disposed within said notch when said arcuate arms are received in said annular groove;
 (g) said slip bushing being provided with a generally cylindrical flange surmounting the flange of said liner bushing when the slip bushing is received within said passage;
 (h) the circumferential periphery of said generally cylindrical flange having a depressed area and a perpendicularly extending shoulder;
 (i) said upright member being accommodated within said depressed area and provided with an inclined lip;
 (j) said inclined lip being contactable with the surface of said depressed area to oppose rotation of the slip bushing;
 (k) said inclined lip being frictionally engaged with said shoulder when said inclined lip is in contact with the surface of said depressed area.

References Cited by the Examiner

UNITED STATES PATENTS 1,603,022  10/1926  Briney _____ 77—62

FRANCIS S. HUSAR, *Primary Examiner.*